United States Patent [19]

Cesal

[11] 4,072,083
[45] Feb. 7, 1978

[54] MILLING HEAD

[76] Inventor: Jiri Cesal, Kaiserstuhlstr. 57, Oberglatt, Switzerland, 8154

[21] Appl. No.: 731,360

[22] Filed: Oct. 12, 1976

[30] Foreign Application Priority Data

Nov. 6, 1975 Switzerland .............. 14469/75

[51] Int. Cl.² .............. B23C 5/26; B23D 5/00
[52] U.S. Cl. .............. 90/11 A; 90/DIG. 2; 408/54; 408/180
[58] Field of Search ............ 90/11 A, 19, 31, 32, 90/DIG. 2, 15 R; 408/54, 180

[56] References Cited

U.S. PATENT DOCUMENTS

| 2,269,320 | 1/1942 | Rosborough | 408/180 |
| 3,143,923 | 8/1964 | Krzyszczuk | 408/54 X |
| 3,183,779 | 5/1965 | Nagel | 90/11 A |
| 3,538,795 | 11/1970 | Fout | 408/180 |
| 3,800,661 | 4/1974 | Omowishi | 90/31 |

Primary Examiner—Z. R. Bilinsky
Attorney, Agent, or Firm—W. G. Fasse; W. W. Roberts

[57] ABSTRACT

A milling head having a shaft for attachment to a machine tool, and at least one cutting insert or bit, characterized in that the cutting insert is supported in a tiltable or swivelable holder having a swivel axis extending perpendicularly to the axis of rotation of the milling head. Stopping means is situated between the milling head and the holder, against which the holder rests in its working position. A cam plate is held in a stationary position such that the cam plate cooperates with the holder to tilt or swivel the latter along a portion of its arcuate movement thereby lifting the cutting insert off the surface to be machined. The stopping means may include travel limit elements that comprise a bore in the holder and a protruding pin which engages with the bore. Biasing means is provided in the form of a spring arranged so that it tends to bias the holder into its working position.

10 Claims, 4 Drawing Figures

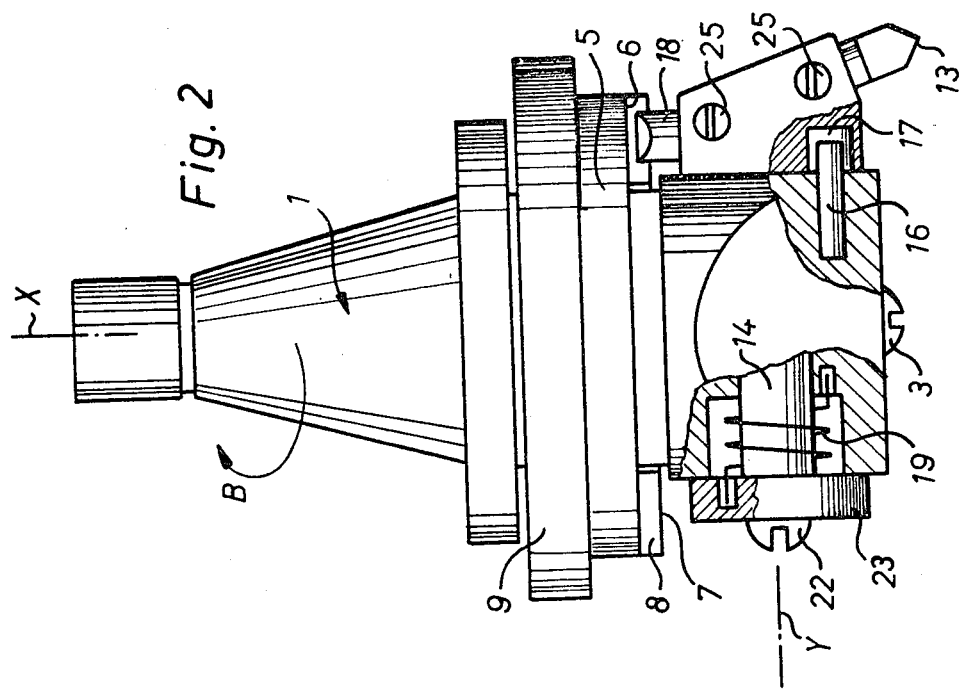
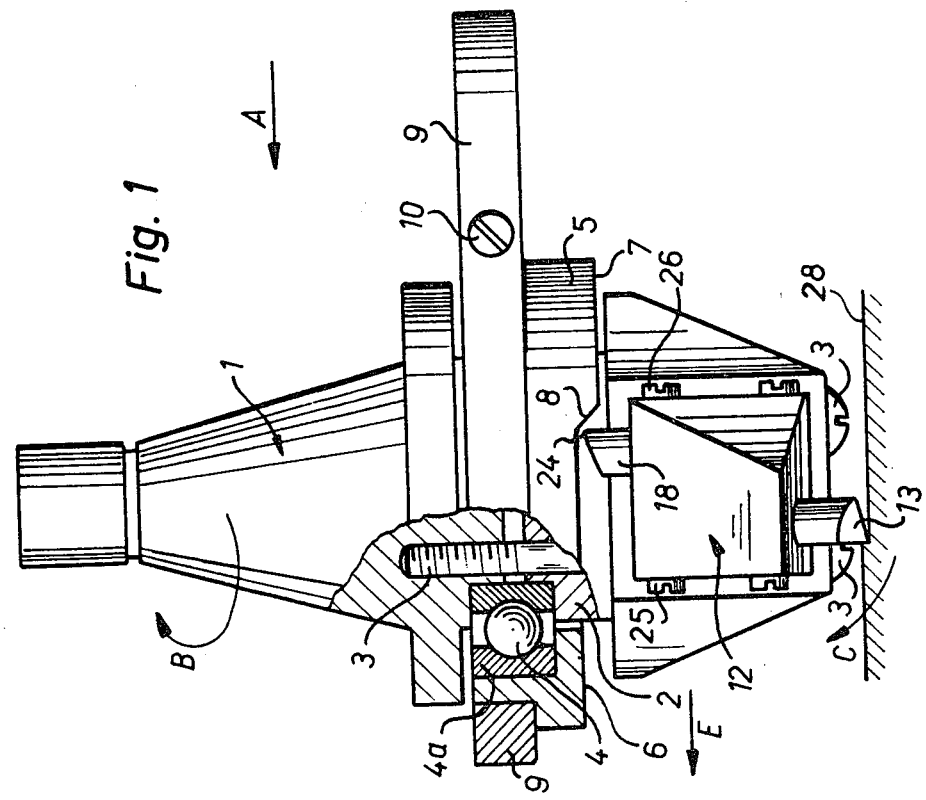

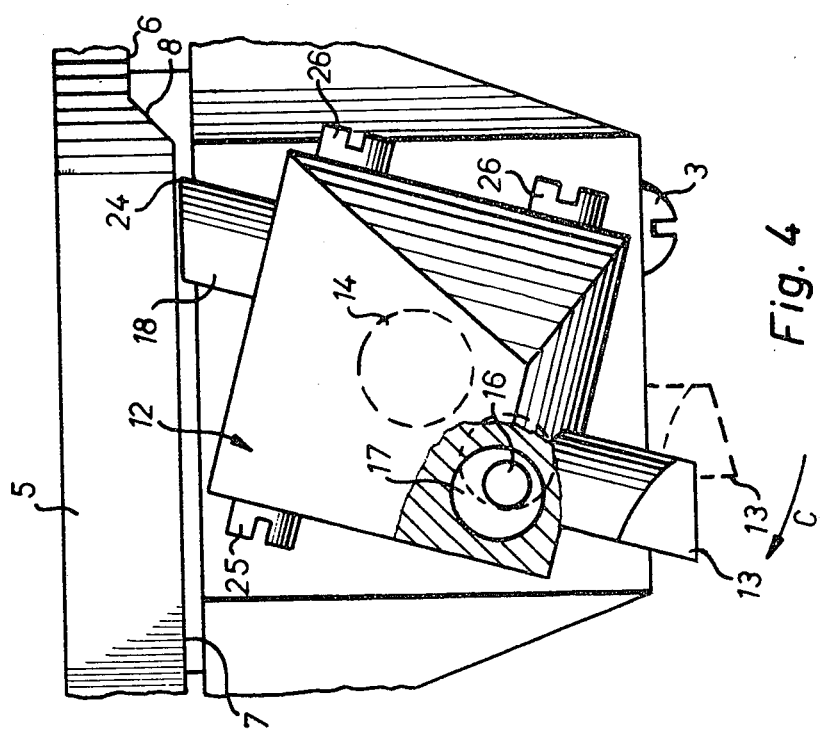
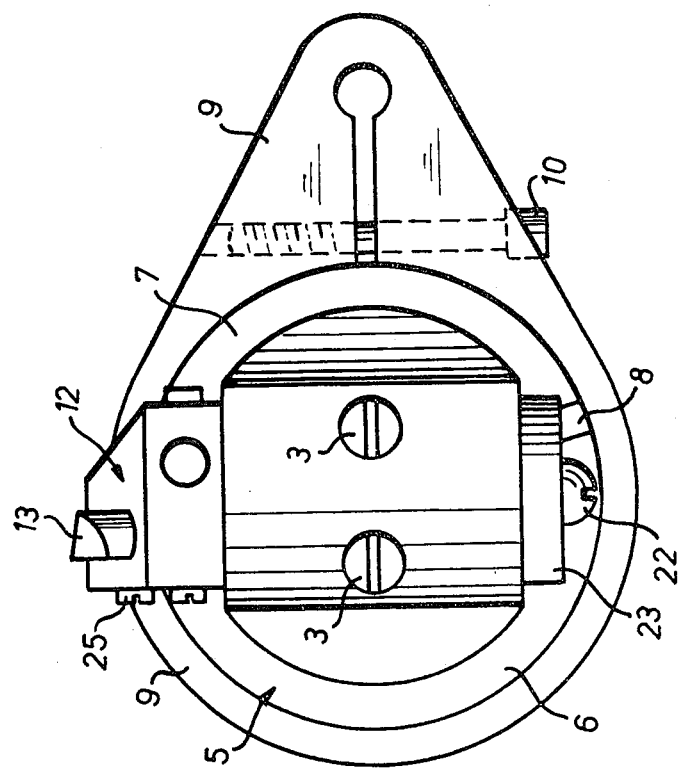

MILLING HEAD

BACKGROUND OF THE INVENTION

The invention relates to a milling head with a shaft for attachment to a machine tool and having at least one cutting insert or bit.

When machining metal by means of milling on the forward face of the tool, the removal of metal chips is performed by cutting edges on the forward rotational half of the tool facing in the feeding direction. Because of the tendency of the material to spring back, the back rotational half of the cutting edges also leave milling traces behind, whereby the top surface, or finish of the workpiece becomes irregular. This is not acceptable on high precision machined surfaces.

It has already been attempted to avoid this disadvantage, by inclining the milling axis of the milling tool, the so-called facing cutter. However, such inclining has the undesired effect of giving the machined path along which the tool has moved, a slightly concave bend.

OBJECTS OF THE INVENTION

In view of the foregoing, it is the aim of the invention to achieve the following objects singly, or in combination:

to provide a milling head which machines exactly plane surfaces of high precision and a fine surface finish;

to provide a milling head that automatically lifts the cutting insert or bit above the work surface during the non-cutting portion of each cycle to prevent milling traces on the machined surface;

to provide a milling attachment which is indexed to move the cutting insert rearwardly above the work surface during the back rotational half of each cutting cycle and thereafter return the cutting insert during the front rotational half of each cutting cycle for engagement with the workpiece; and to provide a milling attachment including a tool holder that is actuated by camming means between a lower cutting position and a retracted non-cutting position, with stopping means to limit the travel between the two positions.

SUMMARY OF THE INVENTION

The invention which solves this problem is characterized in that the cutting insert is supported in a holder that has the ability to swivel. The swivel axis is perpendicular to the axis of the milling head. Stopping elements are located between the milling head and the holder, against which the holder rests in its working position. A cam which is rotatable relative to the shaft is held in a stationary position. This cam cooperates with the holder by tilting it along a portion of its arcuate rotation thereby lifting the cutting insert from the working surface.

Due to this feature the top surface produced by the tool during its forward arc of rotation, will not be scratched and the surface appearance produced by the milling will not be destroyed because the cutting edge is above the working surface on its rear rotational arc. Because the axis of rotation of the milling head is exactly perpendicular to the working surface milled surfaces result which are of high precision and which are exactly plane.

BRIEF FIGURE DESCRIPTION

In order that the invention may be clearly understood, it will now be described, by way of example, with reference to the accompanying drawings, wherein:

FIG. 1 is a side view of the milling head, partially in cross section;

FIG. 2 is an end view of the milling head in the direction of the arrow A in FIG. 1;

FIG. 3 is a bottom view of the milling head of FIG. 1; and

FIG. 4 is a fragmentary enlarged view of the holder as compared to FIG. 1, and in a tilted position.

DETAILED DESCRIPTION OF PREFERRED EXAMPLE EMBODIMENTS:

Referring to the drawings there is illustrated in FIGS. 1 through 4 a milling head which comprises a conical shaft 1 by means of which it may be connected to a conventional machine tool, for example, a milling machine or a jig drill. The bottom piece 2 of the milling head is rigidly connected to the upper part of the milling head, or to the shaft 1, by means of at least two screws 3. A ball bearing 4 is located between these two parts. On the outer race or retaining ring 4a of this ball bearing 4 a cam ring 5 is situated. Camming means is provided in the form of a cam ring 5 that has two cams facing downwardly and forming inclined planes 8.

Two radially extending ring surfaces 6 and 7 are connected to each other by means of the two inclined planes 8. Each of the two radially extending ring surfaces 6 and 7 lies in a horizontal plane. The two planes or rather the two ring surfaces are spaced from each other by a distance determined by the inclined planes 8 whereby the two ring surfaces 6 and 7 are at two distinct levels. The two inclined planes 8 are spaced from each other by an arc over an angle of less than 180°, preferably about 155°, whereby the arc of more than 180°, as seen from the axis of rotation "X", extends in the feed direction. A laterally extending arm 9 is connected to the cam plate 5. By means of a clampling or tightening screw 10 for releasing a clamping joint this arm 9 may be loosened from the cam plate 5 so that the arm 9 may be rotated (i.e. angularly adjusted) relative to the cam plate 5, if desired. The arm 9 itself is anchored during operation by stationary elements not illustrated.

A tiltable holder 12 carrying a cutting knife, tool, or element 13 is situated on the bottom part of the milling head 2. The cutting tool or bit 13 is clamped into position in the holder 12 by means of two screws 25 whereby the cutting element 13 is exchangeable. Mounting means is operatively associated with the holder 12 and comprises a cylindrical insert 14 which is rotatable in the bottom part of the milling head 2, however, practically without play. The cylindrical insert 14 is secured by means of a screw 22 and a washer 23 so that there is no axial movement but so that it can easily swivel or rotate. The holder 12 is forced into the working position by biasing means that may be in the form of a spring 19. In operative relationship with the spring 19 stopping or limit means is provided that may take the form of a pair of cooperating travel limit elements or trip dogs 16 and 17 that touch or engage each other when the cutting element 13 engages the workpiece surface 28. The swivel axis "Y" of the holder 12 and the axis of rotation "X" of the milling head extend exactly perpendicular to each other. The axis of rotation "X" extends vertically on the machined workpiece surface 28. The travel limit elements or trip dogs comprise a bolt or pin 16, which is inserted in the bottom part 2 of the milling head in parallel to the axis "Y" and which extends or protrudes into a cavity or borehole 17 of the holder 12. This borehole 17 has a substantially larger diameter than the bolt 16 to permit for the angular displacement therebetween and contact of the element 16 relative to the wall of the cavity 17.

In operation the borehole 17 and the pin 16 take up the operative position as shown in dotted lines in FIG. 4. In the swiveled out position of the holder 12, which is shown in solid lines in FIG. 4, that is, after turning of the holder in the direction of the arrow "C", the trip dogs 16 and 17 no longer touch each other.

A sliding head 18 extends upwardly from the holder 12 and cooperates with the cam plate 5. The sliding head 18 is fastened exchangably to the holder 12 by means of two lateral screws 26. The length of the sliding head 18 is selected so that in the working position according to FIG. 1, it does not touch the surface 6 of the cam plate 5, but the position of the holder 12 is determined by the two trip dogs 16, 17 which touch each other. As soon as the sliding head or cam follower 18 comes into the range of the inclined surface 8 during the rotation of the milling head, the contact of its upper edge 24 with the inclined surface 8 causes the swiveling or tilting of the holder 12 in the direction of the arrow "C". After this tilting the upper edge 24 of the sliding head 18 rests against the lower radially extending ring surface 7. Instead of one single holder 12 the milling head can also be provided with several circularly arranged holders, which successively mesh with or engage the cam plate 5.

For working a flat or plane surface the position of the cam plate 5 together with the arm 9 is adjusted so that the radial ring surface 6 extends in the direction of the feed advance in the direction of arrow "E" so that the two inclined planes 8 lie in a common connecting line perpendicular to the feed advance direction of arrow "E".

The arm 9 is held by a fixed member extending away from the machining device so that the arm 9 cannot turn. Thus, due to the feed advance in the direction of the arrow "E" when the cutting edge 13 of the milling head contacts the workpiece the holder 12 rests against the trip dogs 16 and 17. In this context it is assumed that the milling head 1 rotates in the direction of the arrow "B". During the first forward facing angle of rotation of 180° the cutting edge 13 removes material from the workpiece in a manner well known. During the following rear portion of the angle of rotation, which may be labeled as the non-cutting return stroke, sliding head 18 comes into contact with the inclined plane 8 of the cam plate 5 whereby the holder 12 is swiveled or tilted in the direction of the arrow "C", that is, relative to the direction of rotation "B", in the forward direction, so that during the rear portion of somewhat less than 180°, of the circular movement, the holder is lifted off of the work surface. The cutting edge 13 only comes back to its starting position during the forward half of the arc in the working position depicted in FIG. 1. The above described process now repeats itself.

If the feed advance is to extend in the opposite direction, the arm 9 is rotated by 180° relative to the cam plate.

By means of the described construction of the forward milling head in combination with a carefully designed cutting edge 13 it is possible to get such a good surface finish on the workpiece surface that it is comparable to a ground or polished surface.

Although the invention has been described with reference to specific example embodiments, it is to be understood, that it is intended to cover all modifications and equivalents within the scope of the appended claims.

What is claimed is:

1. A milling head comprising a shaft means for attachment to a machine tool, said shaft means defining a rotational axis, a tiltable holder means adapted to retain cutting means and defining a tilting axis extending perpendicularly to said rotational axis of said shaft means and mounting means operatively mounting said holder means relative to said shaft means so as to swivel said holder means along a portion of each revolution of the milling head means whereby the cutting means is lifted off from the surface to be machined, and in another portion of each revolution of the milling head means is engaging the surface to be machined, said mounting means further comprising camming means operatively associated with said holder means and with said mounting means, said camming means comprising a cam plate, and a cam follower means mounted relative to said cam plate for imparting said swivel motion of said holder means relative to said mounting means.

2. The milling head of claim 1, wherein said mounting means comprise means to limit the arcuate travel of said holder means relative to said mounting means.

3. The milling head of claim 2, wherein said travel limit means includes an opening in said holder means, and a protruding pin extending from said mounting means for engaging said opening.

4. The milling head of claim 1, and further including biasing means operatively associated with said holder means to urge said holder means into its working position for engaging a surface to be machined.

5. The milling head of claim 1, wherein said cam plate is rotatably supported relative to said shaft means, and wherein said cam follower means extends outwardly from said holder means to engage said cam plate.

6. The milling head of claim 5, wherein said cam plate comprises a ring member having two arcuate surfaces extending at different levels on one side of said cam plate and two inclined surface portions interconnecting said arcuate surfaces to each other.

7. The milling head of claim 6, wherein said two inclined surface portions are spaced from each other in said ring member along an arc spanning an angle less than 180°.

8. The milling head of claim 6, wherein said two inclined surface portions are spaced from each other in said ring member along an arc spanning an angle of about 155°.

9. The milling head of claim 5, wherein said mounting means further include a radially extending arm connected to said cam plate, said arm being angularly adjustable and lockable relative to said cam plate.

10. The milling head of claim 5, wherein said cam plate comprises means to obtain a swiveling motion of said holder means in the forward direction relative to the direction of rotation of said holder means.

* * * * *